United States Patent
Newton et al.

(10) Patent No.: US 10,473,107 B1
(45) Date of Patent: Nov. 12, 2019

(54) VARIABLE PERFORMANCE AXIAL FLOW DUCTED FAN WITH HIGH EFFICIENCY AND REDUCED CURRENT DRAWN

(71) Applicants: Stephen Thomas Newton, Lakewood, CO (US); Stephen Thomas Newton, II, Fountain, CO (US)

(72) Inventors: Stephen Thomas Newton, Lakewood, CO (US); Stephen Thomas Newton, II, Fountain, CO (US)

( * ) Notice: Subject to any disclaimer, the term of this patent is extended or adjusted under 35 U.S.C. 154(b) by 91 days.

(21) Appl. No.: 15/826,116

(22) Filed: Nov. 29, 2017

(51) Int. Cl.
| | |
|---|---|
| F04D 25/06 | (2006.01) |
| H02K 1/17 | (2006.01) |
| H02K 21/24 | (2006.01) |
| F04D 29/32 | (2006.01) |
| F04D 29/36 | (2006.01) |
| H02K 7/14 | (2006.01) |
| H02K 1/24 | (2006.01) |
| F04D 29/40 | (2006.01) |
| B64C 11/00 | (2006.01) |

(52) U.S. Cl.
CPC ....... *F04D 25/0606* (2013.01); *F04D 29/326* (2013.01); *F04D 29/362* (2013.01); *F04D 29/403* (2013.01); *H02K 1/17* (2013.01); *H02K 1/24* (2013.01); *H02K 7/14* (2013.01); *H02K 21/24* (2013.01); *B64C 11/001* (2013.01)

(58) Field of Classification Search
CPC .. F04D 25/0606; F04D 29/326; F04D 29/362; F04D 29/545; H02K 1/17; H02K 1/24; H02K 21/24; B64C 11/001
See application file for complete search history.

(56) References Cited

U.S. PATENT DOCUMENTS

| | | | | |
|---|---|---|---|---|
| 4,618,806 A | * | 10/1986 | Grouse | F04D 25/0606 310/180 |
| 5,075,606 A | * | 12/1991 | Lipman | H02K 7/14 310/63 |
| 5,616,974 A | * | 4/1997 | Yamada | F04D 25/066 310/216.083 |
| 6,896,492 B2 | | 5/2005 | Masterson | |
| 9,143,023 B1 | * | 9/2015 | Uskert | H02K 16/00 |
| 2005/0147501 A1 | | 7/2005 | Cheng | |
| 2006/0016929 A1 | | 1/2006 | Mohr | |
| 2006/0197394 A1 | * | 9/2006 | Applegate | F04D 25/066 310/156.08 |
| 2010/0148515 A1 | * | 6/2010 | Geddry | F03B 17/061 290/55 |
| 2012/0128494 A1 | | 5/2012 | Pelley | |

(Continued)

*Primary Examiner* — Ryan A Reis

(57) ABSTRACT

The ideal design for a fan with variable performance that can replace a family of current axial flow ducted, un-ducted, and centrifugal fan designs by meeting air flow and pressure requirements while drawing less electric current to rotate and thus produce the required flow not only would reduce cost of operation over the life of the fan but opens new possibilities for direct connection to solar collection systems by greatly extending the life of the battery charge employed by the designer of the collection system. In addition the entry of flying machines using pairs of lifting fans such as hover bikes and quadcopters, manned or unmanned is driving a need to re-examine the application of force applied to rotate these fans to achieve a reduction in aircraft weight and increase flying time for a given battery charge or load of fuel.

15 Claims, 4 Drawing Sheets

(56) References Cited

U.S. PATENT DOCUMENTS

2016/0152327 A1* 6/2016 Bertels ................. B64C 11/001
                                                            417/423.7
2017/0104385 A1* 4/2017 Salamon ................. B63H 3/06

* cited by examiner 8.   9.   10.

VARIABLE PERFORMANCE AXIAL FLOW DUCTED FAN WITH HIGH EFFICIENCY AND REDUCED CURRENT DRAWN

CROSS REFERENCE TO RELATED APPLICATIONS

This application claims priority from U.S. Provisional Application Ser. No. 62/427,292 filed Nov. 29, 2016.

STATEMENT REGARDING FEDERALLY SPONSORED RESEARCH OR DEVELOPMENT

This invention was not made with U.S. Government support.

BACKGROUND PRIOR ART

1. Technical Field

The present invention relates generally to ducted axial flow fans and, in particular, to high efficiency fans having reduced power consumption.

2. Description of Related Art

Ducted axial flow fans are axial flow fans mounted within a cylindrical shroud or duct. The duct reduces losses in thrust from the tips of the propellers, reduces noise and varying the fan blade angle of attack allows the designer to advantageously affect the velocity and pressure of the airflow.

An axial fan is a type of a compressor that increases the pressure of the air flowing through it. The blades of the axial flow fan force air to move parallel to the shaft about which the blades rotate. In other words, the flow is axially in and axially out, linearly, hence their name.

Typically these fans are driven with electric motors selected because of their ability to produce high torque to deliver the turning force for starting the fan and bring it to full operational speed of rotation without the necessity for a transmission.

The electric motors described drive fan rotation directly through the hub or indirectly utilizing a combination of pulleys and belts, or gears to gain mechanical advantage. Mechanical advantage comes at the cost of maximum speed of rotation.

Whether the motor drives the fan directly or indirectly the motive force is delivered to a hub on which fan blades are mounted thusly rotating the hub and the fan blades attached there upon.

The force resisting the fan's rotation during production of air flow is aerodynamic drag, including profile and induced drag, the sum of which can be mathematically applied at the blade tips.

The torque required to rotate the fan is approximately congruent to the summation of drag multiplied by the length of the fan blade plus any friction applied to the hub.

Agricultural and industrial fans are valuable tools for moving air as required in a wide variety of cooling, drying, HVAC, agricultural and industrial processes.

A ducted axial fan can be employed in applications where back pressure may be encountered such a drying grain, ventilation for livestock production, temperature control, ventilating green houses, or propulsion such as a propeller in a duct for a lifting fan for hovercraft.

The continuous nature of most production fan operations puts a high demand on electric current and the attending cost thereof.

Ventilation systems used in agricultural or commercial settings are required by functional specifications to have certain minimum airflow rates based on occupancy, thermal load, or other specifications.

Airflow across conventional ductless axial flow fans tends to generate turbulence and inefficiencies at the rotor tips. Turbulence is also generated in ducted axial fans at the rotor tips if the spacing between the rotor tips and duct wall exceeds a particular threshold.

Close tolerances with a rotating body require highly precise machining. While increased tolerances to reduce the cost of manufacture have the tradeoff of air turbulence that reduces fan efficiency and increases the noise generated during fan operation.

Fan rotors housed inside ducts are required for internal flow cases, when air is piped through networks of ducts. Ducted applications require high flow rates to achieve the required heating, cooling, or ventilation. They also require high total pressures due to the resistance generated by the airflow through the duct network. A properly designed fan shroud, or duct, that surrounds the blades of a fan will generally improve the efficiency of the flow of air through the fan. However, the motor size, air flow efficiency, noise generated by the fan, and related factors continue to be problematic in the industry.

Centrifugal fans produce a higher change in pressure across a single stage; hence centrifugal compressors are selected for smaller turboshaft engines. Axial flow compressors can raise total compression over multiple stages as often seen in turbojet applications. If all stages are driven on one shaft, stator stages must be employed between each rotating stage to straighten air flow to gain the pressure increase desired. Stators need not be employed if each production stage rotates opposite the next.

Power consumption is a big cost element in all types of production. Force applied to rotate the axial fan through the hub may be a common practice based on a design compromise. Commercial helicopters only lift 10 pounds per horse power applied when the definition of horsepower is 550 pounds being raised one foot per second. This background leads to examining of prior art relevant to this application.

In the electronics industry small tip driven fans have been patented to reduce noise and electric feedback in component cooling applications for computers and servers sensitive to the field reversal in electric motors. The electric fan devices disclosed in patent numbers U.S. Pat. Nos. 5,616,974 and 6,896,492 employ tip magnets to drive the motor. These small fans are not subject to physical distortion caused by larger fans producing more flow and pressure.

An example of a proposed electric rotor driven by permanent magnets in and near the fan blade tips is a flying vehicle which was disclosed in patent publication number US 20060016929. This device features magnets mounted in holes drilled near the blade tips. The blades are counter rotated in a duct in which a stator is mounted. The dual counter rotating blades are similar to the Hiller 1031 flying platform tested for the U.S. Army. The Flying Platform program was cancelled because the single duct flying machine was too stable to gain forward motion. The bell shaped duct inlet acting as an airfoil applied enough lift that it did not permit directional control or forward speed as desired. In short it was too stable to guide the airflow directionally with pilot body weight displacement and that was a program goal. Even with aileron style directional control surfaces attached, the maximum speed attained was less than 20 miles per hour.

Lifting fans, especially large diameter fans, need to account for blade coning in the hub design or supports. Coning is a well-known phenomenon addressed in helicopter rotor systems. Aerodynamic forces distort the blades conically as lift is produced.

With a rotor blade being pulled by magnets in its blade tips, the coning described would tend to pull the blade tip up, in and thus away from the stator and could in this way disrupt the electromagnetic energy rotating the blade discs.

Therefore there is a need for a fan design that brings a new approach for achieving high flow and pressure while reducing cost and increasing efficiency. This fan design must be effective across a wide range of pressures and flow rates. It must be versatile and the form factors must fit in a range of systems, and be more cost-effective to operate and manufacture than multiple fans that have more specific operating points. And the structure of the fan must support continuous operation under high loading without deformation of aerodynamic surfaces to the point the electromagnetic forces driving the fan are disrupted.

3. Summary of the Invention

The ideal design for a fan with variable performance that can replace a family of current axial flow ducted, un-ducted, and centrifugal fan designs by meeting air flow and pressure requirements while drawing less electric current to rotate and thus produce the required flow not only would reduce cost of operation over the life of the fan but open new possibilities for direct connection to solar collection systems by greatly extending the life of the battery charge employed by the designer of the collection system. In addition the entry of flying machines using pairs of lifting fans such as hover bikes and quadcopters, manned or unmanned is driving a need to re-examine the application of force applied to rotate these fans to achieve a reduction in aircraft weight and increase flying time for a given battery charge or load of fuel.

It is an advantage of the presently disclosed device to provide an axial flow fan with a design approach that moves the application point of magnetic force required to rotate the fan so as to reduce current drawn to produce flow and pressure throughout the full range of operation.

It is a further advantage of the presently disclosed device that by applying the magnetic force to drive fan rotation beyond the blade tips rather than through the hub, less magnetic force is required to rotate the fan. Torque required remains constant as only the point where force is applied has moved.

It is a further advantage of the presently disclosed device that the physical structure of each blade mounting axle or propeller body has been harnessed as a lever to rotate the fan yet resisting physical distortion of coning under high loading.

It is a further advantage of the presently disclosed device that it is the point of the application of magnetic force that reduces the magnitude of force required across the entire range of operation including start up when torque required is at its peak.

It is a further advantage of the presently disclosed device that less magnetic force required to rotate the fan gives the designer options to reduce the size of the coils and permanent magnets employed in the construction of the rotor and stator.

It is a further advantage of the presently disclosed device that the application of force beyond the blade tips means the designer can employ less magnetic force and yet actually increase the torque applied for better performance.

It is a further advantage of the presently disclosed device that it integrates the motor rotor and fan as one assembly providing structure where the motive force can advantageously be applied.

The device now disclosed provides for a ducted axial flow fan with a plurality of fixed axles on which the duct and fan blades can be mounted. This lightweight structure resists deformation due to high loading resulting in coning.

The device now disclosed can employ a combination of permanent magnets on the rotor or if the designer chooses electromagnets. As such if electromagnets are selected for the rotor, permanent magnets can be employed by the designer on the stator. Electromagnets can be employed by the designer on both the rotor and the stator.

Mounted outside the duct wall is a plurality of electromagnets or conversely permanent magnets as the designer selects, spaced evenly about the duct. This plurality of magnets combined with the stator encircling it, provides the force to rotate the entire duct and fan assembly about the hub upon closing of the circuit to energize the windings. Thus the entire rotating body becomes the rotor for an integrated electric motor and fan assembly.

The device now disclosed has an integrated stator with electromagnets or conversely permanent magnets as the designer selects, encircling the integrated fan and rotor assembly with sufficient clearance for rotation within.

In the device now disclosed the stator for the electric motor being mounted or fixed in position in a way providing close enough clearance for motor operation yet allowing the rotor assembly to rotate freely within.

It is a further advantage of the presently disclosed device to provide a ducted axial fan with a plurality variable pitch blades, the function of which varies the amount of air flow and pressure produced at a given speed of rotation depending on the angle of attack applied to these blades.

It is a further advantage of the presently disclosed device to provide a ducted axial fan with variable pitch blades which may be feathered at the start of fan rotation so as to unload the fan, thereby reducing the torque required by reducing drag developed while the fan comes up to speed thusly reducing current drawn to produce the motive force applied. Once the fan is at full operational speed, an increase in the angle of attack is applied to load the blades and generate the compression effect that produces the desired flow rate and level of pressure.

It is a further advantage of the presently disclosed device to provide a ducted axial fan with variable pitch blades that are actuated through a simple, easy to manufacture hub and change link assembly mechanism that translates linear non-rotating inputs to rotating linear inputs applied equally to each blade. Thusly accomplishing any desired change in angle of attack and realizing the rate of flow production desired, throughout the full range of operation.

It is a further advantage of the presently disclosed device to provide a ducted axial fan with a plurality of variable pitch fan blades mounted within a duct with zero clearance between each blade tip and the inner duct wall; reducing blade tip vortices in a simple easy to manufacture assembly. Thusly reducing turbulence, noise, and increasing fan efficiency while reducing the high level of manufacturing precision required for close tolerance rotation of a spinning body inside a stationary duct.

It is a further advantage of the presently disclosed device to provide a ducted axial fan housed in a modular unit which functions as a fan mounting housing, that provides bolt on scalability by enabling designers to place a plurality of modular fan units in line, and counter rotate each stage thereby raising pressure across each stage to meet system total pressure requirements.

It is a further advantage of the presently disclosed device to provide a ducted axial fan with variable pitch blades which in a lifting or propulsion application such as a lifting propeller for a quadcopter, provides immediate control inputs when linked mechanically to an aircraft cyclic control system allowing the pilot to vary thrust from each fan in a multi-fan arrangement.

DETAILED DESCRIPTION OF EXEMPLARY EMBODIMENTS

Integrated Fan Rotor Assembly

Figure 1:
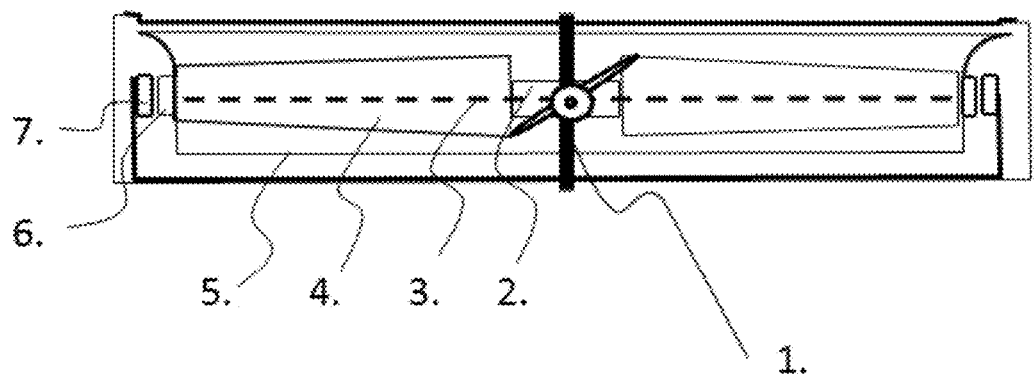
FIG. 1 is a cut away side view of a circular mounting housing embodiment employed with a fixed pitch fan or propeller.
Figure 2:
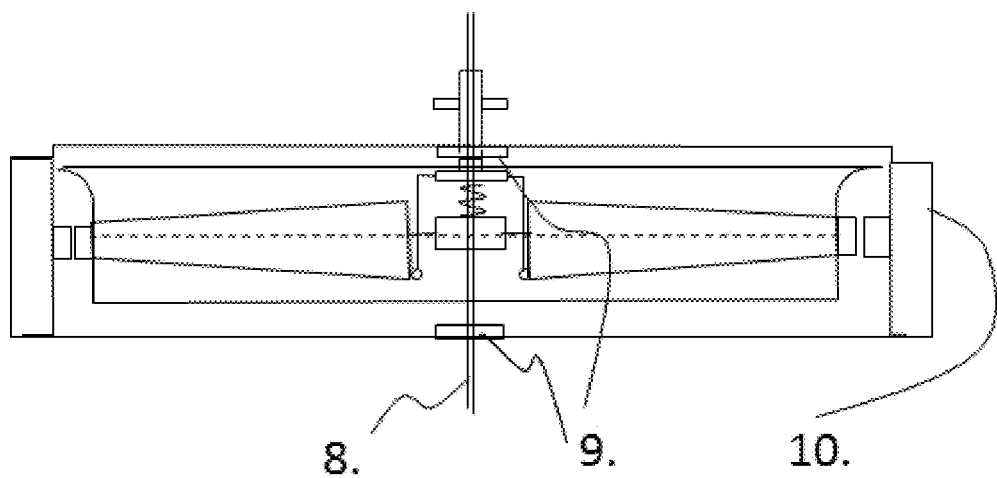
FIG. 2 is a cut away side view of a variable pitch fan or propeller with demonstration of bolt on scalability to achieve multiple stages.

Referring to FIGS. 1 and 2, through a center line drawn from the air inlet through the air outlet is a main axle 1 and 8. This axle is retained in that position by sufficient support as determined by the designer. This support can be a front and rear bearing 9 if the fan is mounted vertically or top and bottom bearing 9.

The main axle 1 and 8 needs to be stiff enough to resist unbalanced rotational forces applied during continuous operation. If the environment in which the fan operates is subject to foreign object damage the designer will have to balance increased structure to account for such risk against the safety issues involved, cost of manufacture, and cost of operation.

Figure 3:
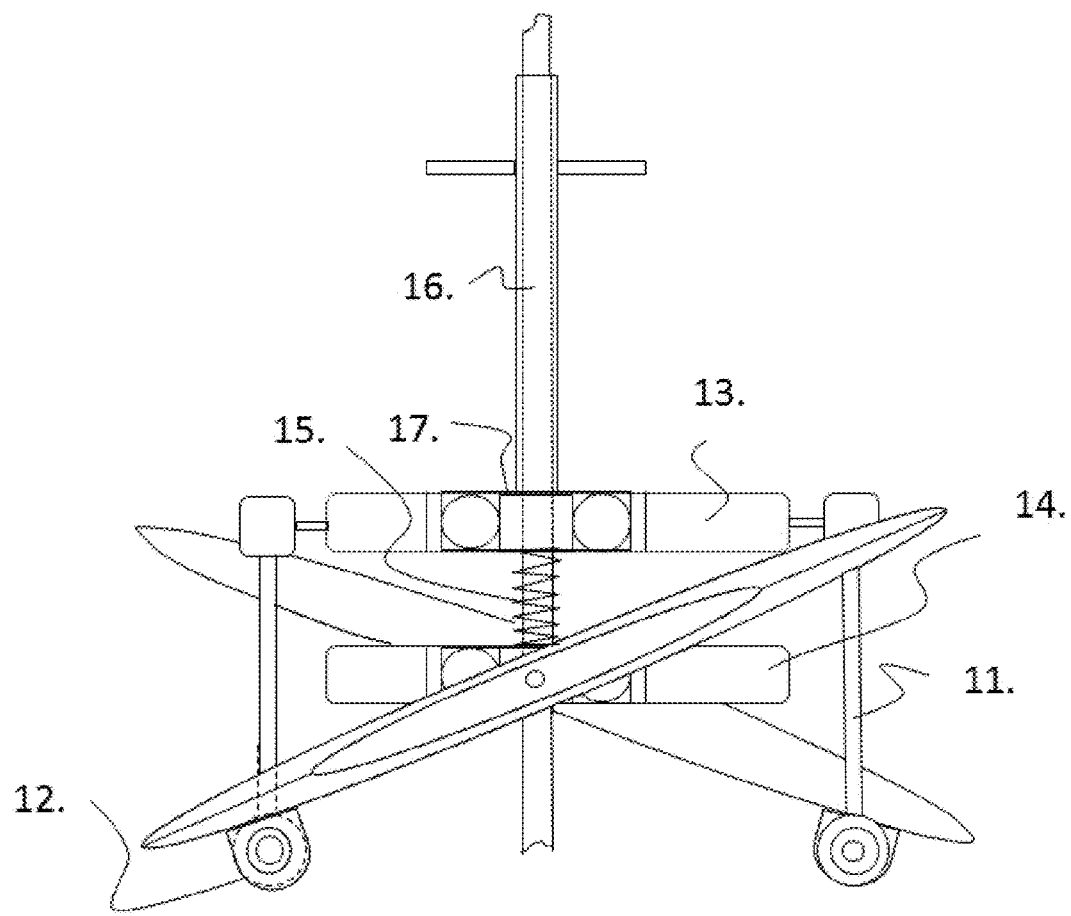
FIG. 3 is a cut away side view of the pitch change mechanism.

Fixed linearly on the main axle 1 and 8 and located at the center point of the stator assembly 7, is a fan blade axle mounting hub 2 and 14 (FIG. 3). This hub is so named as the axles on which the fan blades 4 and 22 are mounted are themselves mounted on this hub. Weight is of primary concern and modern precision manufacturing techniques should be employed to obtain a light weight perfectly balanced hub.

The fan blade axle mounting hub 2 and 14 rides on at least one bearing 9. The positioning of this bearing linearly on the axle is fixed. The bearing enables rotation of the hub about the axle and provides for mounting of the fan blade axles 3 on which the fan blades 4 and 22 are mounted.

The fan blade mounting axles 3 are rigidly fixed in pairs to the fan blade axle mounting hub 2 and 14, extending laterally outward perpendicular to the main axle 1 and 8. Each fan blade axle 3 in the pair is mounted on opposing sides of the main axle 1 and 8.

Upon these axles are mounted fan blades 4 and 22. The aerodynamic properties are selected by the designer so as to achieve the flow and pressure production required by the application at a specified speed of rotation and angle of attack. The blades are reversible for ease of scalability. As such a symmetrical shape is desirable. Weight is of primary concern and modern precision manufacturing techniques should be employed to obtain a light weight perfectly balanced set of fan blades.

The variable pitch fan blades 4 and 22 rotate about the fan blade mounting axle 3, and are not turned by the axle. Changes in the angle of attack are delivered to the blade through a pitch change horn mounted at the base of the blade nearest the mounting hub 2.

The fan blades are connected at the pitch change horn 12, through pitch change links 11 and 21 to a pitch change actuator hub 13 and 18. The pitch change links 11, 21 are mounted evenly around the circumference of the pitch change actuator hub 13 and 18 and extend toward the pitch change horn 12 parallel or nearly parallel to the main axle 1 and 8.

The pitch change actuator hub 13 and 18 is mounted on the main axle 1 and 8 riding on at least one bearing 17. The bearing is free to move linearly along the main axle 1 and 8 so as to deliver the desired pitch control inputs through the pitch change links 11 and 21 to the pitch change horns 12 on the blades.

Riding on the main axle 1 and 8 in between and contacting the outside surface of the inner race of both the fan blade axle hub 2 and 14 and the pitch change hub 13 and 18 is a spring acting as a return device 15.

On the opposite side of the pitch change hub 13 and 18 from fan blade axle mounting hub 2 and 14 and also riding on the main axle 1 and 8 is an actuator tube 16 and 19. This tube contacts the inner race of the pitch change hub bearing 17 and can be moved linearly along the main axle 1 and 8.

On this tube 16, are horizontally mounted horns 19 extending laterally outward perpendicular to the main axle 1 and 8. This provides for connection to an actuator mechanism such as a bell crank mounted as the designer selects such as a mounting horn 20 or an electromechanical connection. Through this mechanism physical inputs are delivered from a separate mechanical or electromechanical apparatus to the fan thereby controlling blade pitch.

Affixed to the ends of the fan blade mounting axles is a duct 5 that encircles the whole assembly.

The fan blade tips should touch the inner wall of the duct 5 but be shaped to allow rotational movement of the blade 4 and 22 about the blade mounting axle 3 as pitch adjustments are applied to the blade 4 and 22.

The duct 5 can be constructed of metal, plastic, or composite materials as selected by the designer. However weight is of primary concern and modern precision manufacturing technics should be employed to obtain a light weight and perfectly balanced duct that also provides structural support to resist deformation under high loads.

Construction of the fan rotor assembly requires the designer to select appropriately sized electromagnets or permanent magnets 6 crafted with provision to be mounted to the end of each fan blade mounting axle and or evenly spaced about the duct 5 as the designer selects, with attachment outside the duct wall to the wall or an extension.

Weight is of primary concern and modern precision manufacturing technics should be employed to obtain a light weight perfectly balanced set of permanent magnets or coils 6 as selected and must be evenly spaced about the duct outer wall.

The designer must make provision for pulling any wiring through the mounting axles 3 or along those axles to the control system as applicable.

The whole assembly described is the fan electric motor rotor assembly.

Mounting Housing

The designer can employ mounting housing 10 and 23 as a means for mounting fan components to provide sufficient structure that takes a box, or cylindrical form factor. This mounting housing 10 and 23 has provision for the stator 7 and main axle 1 and 8. This mounting housing provides a structure on which all necessary componentry is mounted 10 and 23.

It likewise provides for mounting points on which the entire fan can be mounted upon in its operational environment.

The housing 10 and 23 can be open with mounting supports for a lifting embodiment attached to an aircraft like a quadcopter such as FIG. 1 or a box fan or a cylinder as in FIG. 2. The sidewalls can be formed with flanges that add stiffness, strength and logical fastening points.

Figure 4:
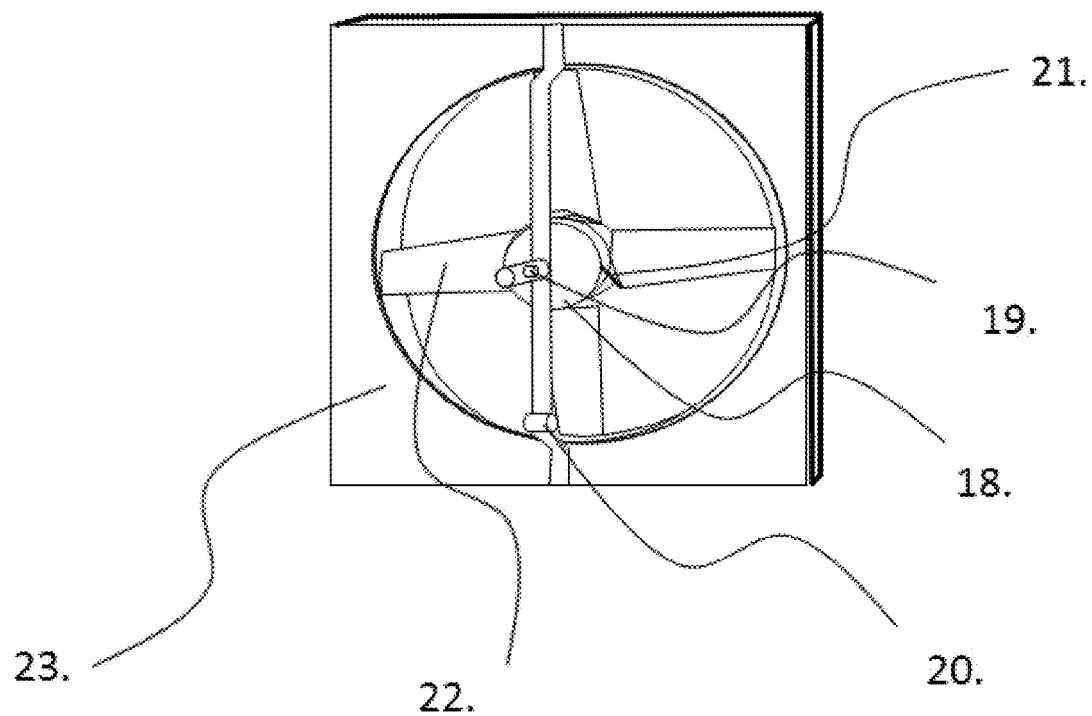
FIG. 4 is a profile view of an agricultural box fan embodiment.

The housing in both FIG. 2 and FIG. 4, could have a structural rear flange oriented outward not interrupting flow, which provides structural support and provides potential for mounting points for internal componentry, mounting points of the unit in its operational environment, and or connection to a subsequent units when multiple units are mounted inline as system requirements dictate.

The housing 10 and 23 open or box style including faceplate, sidewalls, main axle supports front and rear, and rear flange can be easily fabricated from sheet stock or composite material by one accomplished and knowledgeable in the field using common tooling and materials.

The sidewalls may be designed with flanges to attach to the faceplate or the designer might decide to employ welding if the material selected is metallic in nature. If plastic or composite materials are selected the entire housing could be molded as one unit or joined chemically if molded as two parts as the designer deems the application warrants.

Mounted within the modular housing 10 and 23 is the stator assembly 7. The stator needs to be circular in shape so as to encircle the fan blade rotor assembly with a close enough tolerance to function per design yet allowing rotation of the assembly within.

The designer can select the use of electromagnets or permanent magnets 6 to integrate into the stator assembly. The final design must allow the rotation of the fan blade rotor assembly while obtaining the performance specified to meet system requirements.

The housing 10 and 23 will support the main axle 1 and 8 using a single support or combination of supports as deemed necessary by the designer.

The designer can also employ the supports to mount actuators 20 such as bell cranks to deliver mechanical or electromechanical inputs to adjust fan blade angle of attack.

The housing itself could include provision for bolt on scalability as illustrated in FIG. 2 meaning that multiple housing units could be easily fastened together inline inlet to outlet. Thus fan units now become stages in a turbo machine.

The wiring harness for the rotor and stator should be reversible with one switch or plug that can be reversed to change the direction current flows through the motor as assembled. This will rotate the entire rotor assembly within the stator 7 in the opposite direction from the proceeding unit allowing counter rotation of each successive unit or stage.

We claim:

1. A fan system comprising:
   a housing for mounting fan components and comprising of an airflow inlet, airflow outlet, a means to control field reversal, stator mounting apparatus and main axle mounting apparatus;
   an electric motor rotor and fan assembly mounted in the housing comprising of a main axle, a blade mounting hub, a plurality of fan blades, a rotating duct, a plurality of magnets;
   a main axle extending along an axis defined between the airflow inlet and airflow outlet;
   a blade mounting hub coaxially disposed along the main axle within the fan duct;
   the blade mounting hub supporting the plurality of fan blades evenly spaced around the blade mounting hub;
   a rotating duct mounted on an end tip of each fan blade;
   the rotating duct supporting a plurality of evenly spaced electromagnets on an outer wall;
   a stator fixed on the stator mounting apparatus in the housing;
   the stator having a plurality of evenly spaced permanent magnets;
   the stator mounted such that the rotor assembly rotates freely within the housing;
   a field reversal control means configured to reverse current to the electric motor rotor and thus reverse a magnetic field generated so as to apply force to the outer duct wall and the electromagnets mounted thereto in relation to the stator to drive fan rotation;
   an axial flux permanent magnet motor to drive fan rotation.

2. The fan system of claim 1 wherein the fan blades are mounted on a plurality of fan blade mounting axles fixed on the fan blade mounting hub and extend outward laterally from and perpendicular to the main axle.

3. The fan system of claim 2 wherein the rotating duct fixed upon the end tip of each fan blade encircles the rotor assembly.

4. A fan system comprising:
   a housing for mounting fan components and comprising of an airflow inlet, airflow outlet, means to control field reversal, stator mounting apparatus and main axle mounting apparatus;
   an electric motor rotor and fan assembly mounted in the housing, comprising a main axle, a blade mounting hub, a plurality of variable pitch fan blades, a rotating duct, a plurality of magnets;
   the main axle extending along an axis defined between the airflow inlet and airflow outlet;
   a blade mounting hub coaxially disposed along the main axle within the fan duct;
   the blade mounting hub supported by at least one first inner bearing and race;
   the blade mounting hub supporting the plurality of fan blades evenly spaced around the blade mounting hub;
   the plurality of fan blades forming an axial flow fan;
   a rotating duct mounted on an end tip of each fan blade;
   the rotating duct supporting a plurality of evenly spaced excitation windings;
   a stator fixed in the mounting housing;
   the stator having a plurality of evenly spaced permanent magnets;
   the stator mounted such that the rotor assembly rotates freely within;
   a means to reverse current responsive to the field reversal control means and thus reverse a magnetic field so as to apply force to the outer duct wall and electromagnets mounted thereto in relation to the stator to drive fan rotation;

a permanent magnet motor to drive fan rotation.

5. The fan system of claim 4 wherein the fan blades are mounted on a plurality of axles fixed in the fan blade mounting hub and extend outward laterally from and perpendicular to the main axle.

6. The fan system of claim 5, wherein the blade axles are matched as pairs, the blades of each pair mounted on opposite sides of the main axle.

7. The fan system of claim 4 further comprising an actuator hub located on the main axle adjacent to the blade mounting hub free to travel linearly along the main axle.

8. The fan system of claim 7 further comprising a return spring located on the main axle between the blade mounting hub and the actuator hub contacting the two hubs at the face of respective inner bearing races.

9. The fan system of claim 7 wherein at least one variable pitch fan blade is mounted on each of a plurality of fan blade mounting axles.

10. The fan system of claim 9, further comprising pitch change horns mounted on the base of each blade closest to the main axle configured to actuate changes to pitch in the blades.

11. The fan system of claim 10 further comprising a plurality of pitch change links each with one end fastened to the actuator hub at equally spaced points around the actuator hub and in the same number as the variable pitch fan blades and the opposite end of each link connected to the pitch change horns on the adjustable fan blades.

12. The fan system of claim 11 further comprising an actuator tube configured to deliver control inputs through the actuator hub and pitch change links thereby applying changes to the pitch of each blade simultaneously.

13. The fan system of claim 12 wherein the actuator horns are connectable to the actuator tube apparatus to slide the actuator tube toward a return spring to mechanically change the pitch of the blades.

14. The fan system of claim 13 wherein the permanent magnet motor is an axial flux permanent magnet motor.

15. The fan system of claim 14 further comprising a sinusoidal pulse width modulation control system configured to control the permanent magnet motor.

* * * * *